(12) United States Patent
Bekele

(10) Patent No.: US 10,906,281 B2
(45) Date of Patent: Feb. 2, 2021

(54) POLYMERIC FILM COMPRISING VIBRATION DAMPENING AND BARRIER PROPERTIES

(71) Applicant: CRYOVAC, INC., Charlotte, NC (US)

(72) Inventor: Solomon Bekele, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 157 days.

(21) Appl. No.: 15/780,951

(22) PCT Filed: Nov. 30, 2016

(86) PCT No.: PCT/US2016/064066
§ 371 (c)(1),
(2) Date: Jun. 1, 2018

(87) PCT Pub. No.: WO2017/095839
PCT Pub. Date: Jun. 8, 2017

(65) Prior Publication Data
US 2018/0354246 A1 Dec. 13, 2018

Related U.S. Application Data

(60) Provisional application No. 62/262,974, filed on Dec. 4, 2015.

(51) Int. Cl.
| | |
|---|---|
| *B32B 27/32* | (2006.01) |
| *B32B 27/34* | (2006.01) |
| *B32B 27/30* | (2006.01) |
| *B32B 27/08* | (2006.01) |
| *A61J 1/10* | (2006.01) |
| *A61J 1/12* | (2006.01) |
| *B32B 27/36* | (2006.01) |

(52) U.S. Cl.
CPC ............. *B32B 27/327* (2013.01); *A61J 1/10* (2013.01); *A61J 1/12* (2013.01); *B32B 27/08* (2013.01); *B32B 27/302* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 2250/05* (2013.01); *B32B 2250/24* (2013.01); *B32B 2270/00* (2013.01); *B32B 2274/00* (2013.01); *B32B 2307/102* (2013.01); *B32B 2307/30* (2013.01); *B32B 2307/306* (2013.01); *B32B 2307/308* (2013.01); *B32B 2307/31* (2013.01); *B32B 2307/546* (2013.01); *B32B 2307/558* (2013.01); *B32B 2307/56* (2013.01); *B32B 2307/581* (2013.01); *B32B 2307/72* (2013.01); *B32B 2307/7242* (2013.01); *B32B 2307/7244* (2013.01); *B32B 2307/7248* (2013.01); *B32B 2439/46* (2013.01); *B32B 2439/80* (2013.01); *B32B 2553/02* (2013.01)

(58) Field of Classification Search
CPC ... B32B 27/08; B32B 27/327; B32B 2250/05; B32B 2250/24; B32B 2270/00; B32B 2274/00; B32B 2307/102; B32B 2307/30; B32B 2307/306; B32B 2307/308; B32B 2307/31; B32B 2307/546; B32B 2307/558; B32B 2307/56; B32B 2307/581; B32B 2307/72; B32B 2307/7242; B32B 2307/7244; B32B 2307/7248; B32B 2439/46; B32B 2439/80; B32B 2553/02; B32B 27/302; B32B 27/306; B32B 27/308; B32B 27/32; B32B 27/325; B32B 27/34; B32B 27/36; A61J 1/10; A61J 1/12; A61J 1/1475; A61J 2200/42
See application file for complete search history.

(56) References Cited

U.S. PATENT DOCUMENTS

| | | | |
|---|---|---|---|
| 2011/0125114 A1* | 5/2011 | Bekele | ............ A61F 5/445 604/332 |
| 2013/0302894 A1* | 11/2013 | Bekele | ............ C12M 23/00 435/394 |
| 2015/0246509 A1 | 9/2015 | Bekele | |

FOREIGN PATENT DOCUMENTS

EP          1300238          4/2003

* cited by examiner

*Primary Examiner* — Yan Lan
(74) *Attorney, Agent, or Firm* — Jason R. Womer

(57) ABSTRACT

The presently disclosed subject matter is directed generally to multilayer films suitable for use in forming pouches, such as (but not limited to) bioprocessing pouches. When used in the formation of solution pouches, the disclosed films help prevent or reduce the number of seal failures, such as during transportation or use. The disclosed films comprise first and second vibration dampening layers and first and second barrier layers.

14 Claims, No Drawings

POLYMERIC FILM COMPRISING VIBRATION DAMPENING AND BARRIER PROPERTIES

CROSS-REFERENCE TO RELATED APPLICATIONS

This application claims the benefit of and priority from U.S. Provisional Application No. 62/262,974 filed Dec. 4, 2015.

FIELD OF THE INVENTION

The presently disclosed subject matter generally relates to polymeric films suitable for use in constructing disposable containers for bioprocessing applications. More particularly, the presently disclosed films exhibit high vibration dampening performance in a wide temperature range. In addition, the disclosed films maintain an exemplary gas barrier under low, intermediate, and high relative humidity conditions and do not inhibit the growth of biological cell cultures, cellular aggregates, particles, tissues, and the like.

BACKGROUND

The development and commercialization of many processes in the fields of medicine, chemistry, and agriculture require the use of bioprocessing containers. Cells have typically been grown in vitro in glass, metal, or hard plastic vessels. However, because these culture vessels are not disposable, they tend to be expensive and require maintenance. Particularly, to maintain a sterile or aseptic environment for cell culture, the vessels require sterilization, usually by autoclave or aseptic disinfection prior to and/or subsequent to use. In addition, because glass, metal, and hard plastic vessels are not disposable, it is necessary to have a large amount of space to accommodate storage.

Continuing, the expense of producing cells, biopharmaceuticals, biologicals, and the like is often exacerbated by the required cleaning, sterilization, and validation of conventional bioprocessing containers (i.e., metal, glass, or hard plastic vessels). Attempts have been made to solve this problem with the development of pre-sterilized disposable bioprocessing containers constructed from sheets of flexible, gas-impermeable film that conventionally include at least one ethylene vinyl alcohol (EVOH) layer to increase the gas barrier properties of the structure. As is well known, the barrier properties of EVOH are suitable in low humidity conditions, but degrade substantially when exposed to high humidity. In addition, films typically used for flexible cell culture bags include film surface modifying additives (such as antifogging agents, antistatic agents, anti-blocking agents, and the like) that inhibit cell culture growth.

In addition, filled bioprocessing containers are typically exposed to high levels of external forces (such as vibration) during shipping and/or storage. For example, transporting filled packages via automobile, railway cars, aircraft, and the like expose the packages to high levels of vibration, which can result in bag failures that include pinholes, seal ruptures, body shatter, and the like. Similarly, filled bags stored or used in cold conditions are exposed to externally induced stresses that can result in comparable bag failures.

Therefore, it would be beneficial to provide a flexible film suitable for bioprocessing applications that maintains high resistance to external forces such as vibration on filled packages during transportation, cold storage, and the like.

SUMMARY

In some embodiments, the presently disclosed subject matter is directed to a polymeric film comprising first and second vibration dampening layers, first and second barrier layers, a skin layer, and a sealant layer. In some embodiments, the sealant layer comprises about 20-50 weight percent lock down sealant and about 20-50 weight percent metallocene plastomer with melt index 1.0 and density of less than 0.92. In some embodiments, the vibration dampening layers have a peak tan delta of at least 0.20 at −45° C.

In some embodiments, the presently disclosed subject matter is directed to a 2D or 3D pouch formed from the disclosed film, where the pouch includes front and back sheets oriented in a face-to-face relationship and sealed to each other along adjacent side edges to define an interior compartment.

In some embodiments, the presently disclosed subject matter is directed to a method of reducing or preventing seal failures in a pouch after heat sterilization. Particularly, the method comprises extruding the disclosed film, forming the film into a pouch having an interior space, and subjecting the pouch to standard transportation and use conditions.

DETAILED DESCRIPTION

I. General Considerations

The presently disclosed subject matter is directed to a polymeric film suitable for use in a wide variety of applications, including (but not limited to) the formation of bioprocessing containers. Particularly, the disclosed films comprise at least one primary vibration dampening layer and at least one secondary vibration dampening layer to offset the bag failures that can result from externally induced stresses. In addition, the disclosed films comprise at least two barrier layers that provide the film with high gas barrier characteristics. Further, the disclosed films are biologically inert and free from film surface-modifying additives such that the growth of biological cell cultures is not inhibited.

II. Definitions

Following long standing patent law convention, the terms "a", "an", and "the" refer to "one or more" when used in the subject application, including the claims. Thus, for example, reference to "a film" includes a plurality of such films, and so forth.

The term "adjacent" as used herein refers to the positioning of two film layers in contact with one another with or without an intervening layer (such as a tie layer), adhesive, or other layer therebetween.

As used herein, the terms "barrier" and "barrier layer" as applied to films and/or film layers, refer to the ability of a film or film layer to serve as a barrier to gases and/or odors. Examples of polymeric materials with low oxygen transmission rates useful in such a layer can include: ethylene/vinyl alcohol copolymer (EVOH), polyvinylidene dichloride (PVDC), vinylidene chloride copolymer such as vinylidene chloride/methyl acrylate copolymer, vinylidene chloride/vinyl chloride copolymer, polyamide, co-polyamide, polyester, polyglycolic acid, polyacrylonitrile (available as Barex™ resin), or blends thereof. Oxygen barrier materials can further comprise high aspect ratio fillers that create a tortuous path for permeation (e.g., nanocomposites). Oxygen barrier properties can be further enhanced by the incorporation of an oxygen scavenger, such as an organic oxygen scavenger. In some embodiments, metal foil, metallized substrates (e.g., metallized polyethylene terephthalate (PET), metallized polyamide, and/or metallized polypropylene), and/or coatings comprising SiOx or AlOx compounds can be used to provide low oxygen transmission to a package. In some embodiments, a barrier layer can have a gas (e.g., oxygen) permeability of less than or equal to about 2000 cc/m$^2$/24 hrs/atm at 73° F., in some embodiments less than about 1500 cc/m$^2$/24 hrs/atm at 73° F., in some embodiments less than about 1000 cc/m$^2$/24 hrs/atm at 73° F., and in some embodiments less than about 500 cc/m$^2$/24 hrs/atm at 73° F., in accordance with ASTM D-3985. The entire contents of all referenced ASTMs herein are incorporated by reference.

The term "bioprocessing" as used herein refers to any process that uses living cells or their components (e.g., bacteria, enzymes, chloroplasts, and the like). For example, in some embodiments, bioprocessing can include processes for the production of a product by culturing cells or microorganisms, processes of culturing cells or microorganisms, and/or processes for the bioconversion of one material to another.

The term "bioprocessing container" as used herein refers to a container suitable for use in bioprocessing applications (such as, but not limited to, growing cell cultures). Alternatively or in addition, bioprocessing containers can be used to house any of a wide variety of biological fluids such as serum, buffers, and/or ultrapure water.

The term "bulk layer" as used herein refers to a layer used to increase the abuse-resistance, toughness, modulus, etc., of a film. In some embodiments, the bulk layer can comprise polyolefin (including but not limited to) at least one member selected from the group comprising ethylene/alpha-olefin copolymer, ethylene/alpha-olefin copolymer plastomer, low density polyethylene, and/or linear low density polyethylene and polyethylene vinyl acetate copolymers.

The term "cell" as used herein refers to any cellular matter that can be maintained in a bioprocessing container. For example, in some embodiments, the term "cell" can include (but is not limited to) eukaryotic cells (such as yeast, insect, or mammalian), but in some embodiments can be bacterial. It should be understood that the term "cell" can also encompass any of a wide variety of cellular components.

The term "container" as used herein includes, but is not limited to, any of a wide variety of packages or storage devices including pouches, bags, boxes, cartons, envelopes, bottles, and the like constructed from a polymeric film. The term "container" also includes any packaging or storage device that has been designed for or in support of bioprocessing applications.

The term "directly adjacent" as used herein refers to adjacent film layers that are in contact with each other without any tie layer, adhesive, or other layer therebetween.

As used herein, the term "ethylene/alpha-olefin copolymer" refers to such heterogeneous materials as low density polyethylene (LDPE), linear medium density polyethylene (LMDPE), linear low density polyethylene (LLDPE), and very low and ultra low density polyethylene (VLDPE and ULDPE); as well as homogeneous polymers such as Dowlex SC2107 ethylene/alpha olefin copolymers supplied by Dow Ziegler/Natta catalyzed. These materials generally include copolymers of ethylene with one or more comonomers selected from C4 to C10 alpha-olefins such as butene (i.e., 1-butene), hexene-1, octane-1, and the like in which the molecules of the copolymers comprise long chains with relatively few side chain branches or cross-linked structures. Other ethylene/alpha-olefin copolymers, such as the long chain branched homogeneous ethylene/alpha-olefin copolymers known in the art, are also included.

As used herein, the term "film" can be used in a generic sense to include plastic web, regardless of whether it is film or sheet.

The term "flexible" is used herein to define specific polymeric materials as well as characteristics of a resulting container whereby improved flexibility and/or collapsibility of the container is obtained by the use of these specific polymeric materials. Flexible materials can in some embodiments be characterized by a modulus of less than about 50,000 PSI and in some embodiments less than 40,000 PSI (ASTM D-872-81).

The term "inoculating" or "inoculation" as used herein refers to the introduction of at least one biological component (such as, for example, a cell) to a medium to begin a culture.

The term "liquid medium" as used herein includes any flowable medium that can be used for conventional methods of bioprocessing, such as (but not limited to) cell culture medium.

As used herein, the term "polymer" refers to the product of a polymerization reaction, and can be inclusive of homopolymers, copolymers, terpolymers, etc. In some embodiments, the layers of a film can consist essentially of a single polymer, or can have additional polymer together therewith, i.e., blended therewith.

The term "polymeric film" as used herein refers to a thermoplastic material, generally in sheet or web form, having one or more layers formed from polymeric or other materials that are bonded together by any conventional or suitable method, including one or more of the following: coextrusion, extrusion coating, lamination, vapor deposition coating, and the like.

As used herein, the term "pouch" includes bags, containers, and any sealed package that can house a product, such as a medical solution.

As used herein, the term "seal" refers to any seal of a first region of an outer film surface to a second region of an outer film surface, including heat or any type of adhesive material, thermal or otherwise. In some embodiments, the seal can be formed by heating the regions to at least their respective seal initiation temperatures. The sealing can be performed by any one or more of a wide variety of methods, including (but not limited to) using a heat seal technique (e.g., melt-bead sealing, thermal sealing, impulse sealing, dielectric sealing, radio frequency sealing, ultrasonic sealing, hot air, hot wire, infrared radiation).

As used herein, the phrases "seal layer", "sealing layer", "heat seal layer", and "sealant layer", refer to an outer film layer, or layers, involved in the sealing of the film to itself, another film layer of the same or another film, and/or another article that is not a film. It should also be recognized that in general, up to the outer 1-10 mils of a film can be involved in the sealing of the film to itself or another layer. In general, a sealant layer sealed by heat-sealing layer comprises any thermoplastic polymer. In some embodiments, the heat-sealing layer can comprise, for example, thermoplastic polyolefin, thermoplastic polyamide, thermoplastic polyester, and thermoplastic polyvinyl chloride. In some embodiments, the heat-sealing layer can comprise thermoplastic polyolefin.

As used herein, the term "skin layer" refers to an outer layer of a multilayer film. Such outer film layers are subject to abuse during storage and handling of the packaged products.

As used herein, the term "tie layer" refers to an internal film layer having the primary purpose of adhering two layers to one another. In some embodiments, tie layers can comprise any nonpolar polymer having a polar group grafted thereon, such that the polymer is capable of covalent bonding to polar polymers such as polyamide, PGA, and/or ethylene/vinyl alcohol copolymer. In some embodiments, tie layers can comprise at least one member selected from the group including, but not limited to, modified polyolefin, modified ethylene/vinyl acetate copolymer, and/or homogeneous ethylene/alpha-olefin copolymer. In some embodiments, tie layers can comprise at least one member selected from the group consisting of anhydride modified grafted linear low density polyethylene, anhydride grafted low density polyethylene, homogeneous ethylene/alpha-olefin copolymer, and/or anhydride grafted ethylene/vinyl acetate copolymer.

Any direction referred to herein, such as "top," "bottom," "left," "right," "upper," "lower," and other directions and orientations are described for clarity in reference to the figures and are not to be limiting. It is to be understood that the films or systems described herein can be used in a wide variety of directions and orientations.

All compositional percentages used herein are presented on a "by weight" basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

The definitions and disclosure of the present application control over any inconsistent definitions and disclosures that may exist in an incorporated reference.

III. The Presently Disclosed Film

III.A. Generally

The presently disclosed subject matter is directed to a polymeric film suitable for use in a wide variety of applications, such as (but not limited to) the formation of bioprocessing containers. Particularly, the disclosed film includes at least one vibration dampening layer that provides a high degree of stress resistance to external forces such as vibration. In addition, the disclosed film comprises at least two barrier layers that provide the film with gas barrier characteristics. Further, the disclosed film is biologically inert and is free from surface-modifying additives to ensure that the film does not inhibit the growth of biological cell cultures.

The disclosed film comprises two or more layers to incorporate a variety of properties, such as sealability, gas impermeability, and toughness into a single film. Thus, in some embodiments, the disclosed film comprises a total of from about 1 to about 20 layers; in some embodiments, from about 3 to about 12 layers; and in some embodiments, from about 4 to about 9 layers. Accordingly, the disclosed film can comprise 1, 2, 3, 4, 5, 6, 7, 8, 9, 10, 11, 12, 13, 14, 15, 16, 17, 18, 19, or 20 layers. One of ordinary skill in the art would also recognize that the disclosed film can comprise more than 20 layers, such as in embodiments wherein the film components comprise microlayering technology.

The disclosed film can have any total thickness desired, so long as the film provides the desired properties for the particular packaging operation in which the film is used, e.g., optics, modulus, seal strength, and the like. Final web thicknesses can vary, depending on processing, end use application, and the like. Typical thicknesses can range from about 0.1 to 20 mils; in some embodiments, about 0.3 to 15 mils; in some embodiments, about 0.5 to 10 mils; in some embodiments, about 1 to 8 mils; in some embodiments, about 1 to 4 mils; and in some embodiments, about 1 to 2 mils. Thus, in some embodiments, the film can have a thickness of about 10 mils or less; in some embodiments, a thickness of about 5 mils or less. One of ordinary skill in the art would also recognize that the presently disclosed subject matter also includes embodiments wherein the disclosed films lie outside the ranges set forth herein.

In some embodiments, the disclosed films can comprise printed product information such as (but not limited to) product size, type, name of manufacturer, instructions for use, and the like. Such printing methods are well known to those of ordinary skill in the packaging art.

In some embodiments, the disclosed films are biologically inert (i.e., compatible with cell culture). Particularly, the disclosed films can be substantially free of surface-modifying additives (i.e., the total absence of or near total absence of a surface-modifying additive). In some embodiments, the term "substantially free" refers to about 5% (by weight) or less; in some embodiments, about 4% or less; in some embodiments, about 3% or less; in some embodiments, about 2% or less; and in some embodiments, about 1% or less surface-modifying additives, based on the total weight of the film. Surface-modifying additives are well known to those of ordinary skill in the art and can include (but are not limited to) protein coatings, therapeutic agent coatings, binding agents, and the like.

In some embodiments, the disclosed films exhibit a Young's modulus sufficient to withstand the expected handling and use conditions. Young's modulus can be measured in accordance with one or more of the following ASTM procedures: D882; D5026-95a; D4065-89, each of which is incorporated by reference herein in its entirety. The disclosed films can have a Young's modulus of at 10,000-100,000 pounds/square inch, measured at a temperature of 73° F. Thus, the disclosed films can in some embodiments have a Young's modulus of about 10,000-90,000; 15,000-80,000; 20,000-60,000; 25,000-50,000; or 30,000-40,000 pounds/square inch, measured at a temperature of 73° F. The films can have any of the forgoing ranges of Young's modulus in at least one direction (e.g., in the machine direction or in the transverse direction) or in both directions.

III.B. Vibration Dampening Layers

As set forth herein, the disclosed film includes at least one primary vibration dampening layer and at least one secondary vibration dampening layer. In some embodiments, the primary vibration dampening layer comprises an alpha olefin polymer blended with an acrylate polymer, a styrenic block copolymer, or a modified or grafted acrylate polymer. For example, in some embodiments, the primary vibration dampening layer can comprise no more than (or no less than) about 0, 5, 10, 15, 20, 25, 30, 35, 40, 45, 50, 55, 60, 65, 70, 75, 80, 85, 90, 95, or 100 weight percent alpha olefin polymer blended with an acrylate polymer, a styrenic block copolymer, or a modified or grafted acrylate polymer, based on the total weight of the layer.

The primary vibration dampening layer can be any layer of the disclosed film. For example, in some embodiments, a dampening layer can be positioned as a skin layer and/or a sealant layer. Alternatively or in addition, in some embodiments, the vibration dampening layer can be any intermediate layer.

The disclosed film also comprises at least one secondary vibration dampening layer. In some embodiments, the secondary vibration dampening layer can comprise alpha olefin polymer blended with an acrylate polymer, a styrenic block copolymer, or a modified or grafted acrylate polymer. Thus, in some embodiments, the secondary vibration layer can comprise no more than (or no less than) about 0, 5, 10, 15, 20, 25, 30, 35, 40, 45, 50, 55, 60, 65, 70, 75, 80, 85, 90, 95, or 100 weight alpha olefin polymer blended with an acrylate polymer, a styrenic block copolymer, or a modified or grafted acrylate polymer, based on the total weight of the layer. The secondary dampening layer can be any layer of the disclosed film. For example, in some embodiments, a dampening layer can be positioned as a skin layer and/or a sealant layer. Alternatively or in addition, in some embodiments, the vibration dampening layer can be any intermediate layer. In some embodiments, the primary and secondary dampening layers can be positioned adjacent to each other.

As discussed herein, the disclosed film comprises first and second vibration dampening layers. Particularly, the vibration dampening layers have a peak tan delta of at least 0.20 at −45° C. to −15° C. and tan delta of at least 0.05 at −50° C. Tan delta refers to a material's ability to dampen noise and vibration, and is related to the material's complex Young's modulus (E*=E'+iE", where E' is the real, elastic, or in-phase modulus; E" is the imaginary, viscous, loss, or out-of-phase modulus; A measure of the viscoelastic material is the ratio E"/E', which is also referred to as the dampening factor, tangent delta). All tan delta measurements herein are determined in accordance with ASTM D4065, incorporated herein in its entirety.

The storage modulus of a film can be used to quantify the film's ability to be folded or crumpled during use without the emission of a noticeable level of noise. The storage modulus for a film can be readily obtained from Dynamic Mechanical Analysis (DMA). DMA is a technique that can be used to investigate the stiffness or flexibility of a material. Generally speaking, a vibration (e.g., as a sine wave of constant or variable frequency) is imposed on the sample and the modulus of the material can be measured. The storage modulus of a material (e.g., a film) is related to the material's complex Young's modulus. Films according to some embodiments of the presently disclosed subject matter can beneficially have a relatively low storage modulus such that the film can be easily folded, rolled, and crumpled. This ease in handling translates into resistance to vibration upon use, for example, in bioprocessing pouches.

III.C. Barrier Layers

The disclosed film comprises first and second barrier layers that provide gas barrier characteristics to the disclosed film. The first and second barrier layers can comprise any of the wide variety of barrier materials known in the art, including (but not limited to) EVOH. The first barrier layer can be positioned as the "inner" barrier layer, closest to the sealant layer and the second barrier layer can be positioned as the "outer" barrier layer, positioned closest to the skin layer. In some embodiments, the first and/or second barrier layers can comprise about 100 weight percent EVOH, based on the total weight of the layers.

In some embodiments, the inner barrier layer comprises a higher mol % ethylene compared to the outer barrier layer, which is believed to provide the film with better oxygen transmission rate at wet conditions. For example, in some embodiments, the inner barrier layer can comprise an EVOH with 30-48 mol % ethylene and the outer barrier layer can comprise an EVOH with less than 39 mol % ethylene.

III.D. Sealant Layer

The disclosed film comprises a sealant layer comprising a lock down sealant material, such as (but not limited to) VLDPE. In some embodiments, the lock down sealant material is present in an amount of about 10-60, 20-55, 30-50, or 40-50 weight percent, based on the total weight of the layer.

The sealant layer also comprises a metallocene plastomer with melt index greater than 1.0 and density less than 0.92. In some embodiments, the metallocene plastomer is present in the sealant layer in an amount of from about 10-60, 20-55, 30-50, or 30-40 weight percent, based on the total weight of the layer. The sealant layer also comprises 10-30 weight percent cyclic olefinic polymer or copolymer, based on the total weight of the layer.

III.E. Additional Film Layers

The disclosed films can comprise one or more abuse layers, barrier layers, tie layers, bulk layers, barrier layers, core layers, and/or skin layers, as would be known by those of ordinary skill in the art.

IV. Methods of Making the Disclosed Film

The disclosed film can be constructed using any suitable process known in the art, including (but not limited to) coextrusion, lamination, extrusion coating, and combinations thereof. See, for example, U.S. Pat. No. 6,769,227 to Mumpower; U.S. Pat. No. 3,741,253 to Brax et al.; U.S. Pat. No. 4,278,738 to Brax et al.; U.S. Pat. No. 4,284,458 to Schirmer; and U.S. Pat. No. 4,551,380 to Schoenberg, each of which is hereby incorporated by reference in its entirety.

The disclosed films can be formed by cast coextrusion as a tubular film, or as a flat film. Containers for medical applications or other end uses can be made directly from the coextruded, tubular film, or alternatively from rollstock material obtained from the tube after it has been slit and ply-separated. A hot blown process can also be used to make the disclosed film, although the optical properties of the resulting pouch may be inferior to those from a cast coextrusion process. Other processes, such as extrusion coating, conventional lamination, slot die extrusion, and the like can also be used to make the disclosed film, although these alternative processes can be more difficult and/or less efficient than the preferred method.

In some embodiments, the disclosed films can be crosslinked. As would be known in the art, crosslinking increases the structural strength of a film at elevated temperatures and/or increases the force at which the material can be stretched before tearing apart. In some embodiments, crosslinking can be accomplished by irradiation, i.e., bombarding the film with particulate or non-particulate radiation, such as high energy electrons from an accelerator or cobalt-60 gamma rays. In some embodiments, the irradiation dosage level is about 2-8 megarads (MR). Any conventional crosslinking technique can be used, such as curtain beam irradiation and/or chemical crosslinking (such as the use of peroxides, for example).

V. Methods of Using the Disclosed Film

While the disclosed films can have applications in a wide variety of areas, in some embodiments, they can be suitable for use in constructing bioprocessing containers for cell culturing applications. The presently disclosed bioprocessing containers provide a flexible, disposable environment for culturing cells, cell aggregates, particles, tissues, and the like. The cell culture bags can be stand-alone or can be used with a wide variety of support devices, such as bioreactors, stirred tank reactors, and the like.

A suitable culture container can include a body constructed from first and second flexible sidewalls sealed along their edges to define an inner containment area for housing a product. The first and/or second sidewalls can be constructed from the disclosed film. In some embodiments, the film can be used by itself or with another film to form a double wall container constructed from multiple film plies sealed together around the container perimeter. In these embodiments, the inner and/or outer film plies can comprise at least one barrier layer. Double walled containers are popular in bioprocessing applications due to the increase in abuse resistance properties and are well known to those of ordinary skill in the art.

In some embodiments, to provide a cell growth surface, the interior surface of the container can be treated by any of a wide variety of methods known in the art, including (but not limited to) plasma discharge, corona discharge, gas plasma discharge, ion bombardment, ionizing radiation, and/or high intensity UV light.

In some embodiments, the disclosed container can be pre-sterilized prior to the introduction of biological materials (i.e., cells). As most cell culture procedures are carried out under aseptic conditions by practicing sterile technique, the pre-sterilization of the bioprocessing container allows the culture chamber and the fluid pathway to be maintained in a sterile, closed environment. For example, the disclosed containers can in some embodiments be sterilized by exposure to gamma radiation, ultraviolet radiation, ethylene oxide, or combinations thereof, as would be known to those of ordinary skill in the art. After the bioprocessing container has been sterilized, an appropriate liquid medium can be deposited into the interior of the container, depending on the particular use desired. For example, cell culture medium can be deposited into the container interior to grow a cell culture. The container can then be inoculated and incubated as would be known to those of ordinary skill in the art.

The disclosed bioprocessing container can be configured such that the contents housed therein remain substantially in contact only with the container during use. In such embodiments, the container can be disposable and used for a single reaction or a single series of reactions, after which the container is discarded. Because the liquid in the collapsible container in such embodiments does not come into contact with a support structure (if used), the support structure can be reused without cleaning. That is, after a reaction takes place in the flexible container, it can be removed from the support structure and replaced by a second (e.g., disposable) container. A second reaction can be carried out in the second container without cleaning/sterilizing the first container and/or the reusable support structure.

The disclosed flexible containers can include at least one access port whereby cells and/or cell culture media can be introduced and/or removed. In some embodiments, a syringe or other transport device can be used to introduce materials into the container interior through the access port. It should be appreciated that any number of access ports can be provided in accordance with the disclosed bioprocessing container. For example, in some embodiments, the container can have an access port that functions as an inlet for the introduction of items into the container interior and a separate access port that functions as an outlet. The access port(s) can be equipped with suitable measures for sealing against leakage, such as valves and the like, as would be conventionally known.

In some embodiments, the disclosed container can include one or more gas removal ports. In some embodiments, the gas removal port can transverse both sides of the container and can be fused to the container sidewall. In some embodiments, the gas removal port can include an internal gasket and an external gasket to ensure that there is no leakage around the port where it protrudes through the container. As would be appreciated by those of ordinary skill in the art, the access port can function as the gas removal port in some embodiments.

In some embodiments, the disclosed flexible container can comprise one or more sampling ports that can be used for sampling, analyzing (e.g., determining pH and/or amount of dissolved gases in the liquid), or for other purposes. The sampling ports can be aligned with the one or more access ports of the container. It should be understood that the sampling ports are optional, and that in some embodiments sampling can be accomplished through the access port.

In some embodiments, the disclosed container can optionally include a mixing system, such as a pulsating disk, paddle mixer, rocking platform, impeller, and the like. For example, in some embodiments, the container (and optionally a container support assembly) can be rotated about one axis (such as, for example, the longitudinal axis) of the container. However, the container support assembly and/or the enclosed container can be tilted and rotated at an angle from the longitudinal axis of the container support assembly. Alternatively or in addition, in some embodiments, the disclosed container can include a mixing system (such as an impeller) positioned within the interior of the container. The impeller can be rotated using a motor that can be external or internal to the container.

In some embodiments, the disclosed container can include a heater, such as (but not limited to) a heating pad, a steam jacket, a circulating fluid heater, and/or a water heater. The heater can be located between the container and a support housing or the heater can be incorporated into the housing or container itself. In some embodiments, the bioprocessing container can be placed inside an incubator to maintain a desired temperature. Alternatively or in addition, after filling, the pouches can be subjected to cold storage conditions where they are exposed to temperatures as low as −80° C.

The shape of the flexible container can be determined by the size and shape of the container support assembly (if any) to be used. It should be noted that the disclosed containers can have any of a wide variety of shapes known in the art. To this end, the length and/or diameter of the container can be scaled to any desired and suitable size depending on the particular use. For example, the container can have a volume of about 1-40, 40-100, 100-200, 200-300, 300-500, 500-750, 750-1000, 1000-2000, 2000-5000, or 5000-10000 liters. Thus, in some embodiments, the disclosed container has a volume greater than 1, 10, 20, 40, 100, 200, 500, or 1,000 liters. Volumes less than 1 liter and greater than 10,000 liters are also possible and are included within the scope of the presently disclosed subject matter.

The disclosed container is suitable for any of a wide variety of bioprocessing applications including (but not limited to) cell culturing of prokaryotic or eukaryotic cells, culturing of complex tissues and organs, and similar applications as would be well known in the art. For example, in some embodiments, cell culture medium is added to the interior compartment of the container and is then inoculated with a cell culture.

Thus, any of a wide variety of cells, tissues, and the like can be grown, including but not limited to primary cell cultures, immortalized cell cultures, cultured cells, organs, tissues, etc. In some embodiments, the cell culture can be inoculated with cells prior to adding to the container interior. In these embodiments, the cell culture medium is pre-inoculated and then added to the interior compartment of the bioprocessing container. Once the culture medium and cells have been deposited into the interior compartment, the cells can be incubated within the interior of the container under conditions suitable for cell growth (i.e., temperature, agitation, and the like). Suitable conditions for each particular cell type are well known to those of ordinary skill in the art or can be ascertained using routine experimentation.

The disclosed films have been described in connection with a pouch for use in bioprocessing applications. However, it is to be understood that other applications for the films are also possible and are within the scope of the presently disclosed subject matter.

VI. Advantages of the Presently Disclosed Subject Matter

In some embodiments, the disclosed film can be used to construct a flexible and disposable container for a variety of purposes, including media preparation, buffer preparation, storage of cell products, culturing cells, culturing microorganisms, culturing plant metabolites, processing foods, processing chemicals, processing biopharmaceuticals, processing biologicals, and the like. The disposable bioprocessing container assembly allows a user to operate the culture or production with relative ease and little training.

The disposable system disclosed herein does not require cleaning or sterilizing after use, thereby preserving user time and resources.

In addition, the disclosed film can be used to provide an improved cell culture container for growing cells in vitro. Specifically, the disclosed film lacks cell surface modifiers that can interfere with cell culture techniques. The disclosed film also provides a vibration dampening feature to the disclosed bioprocessing containers that resist package failure in cold storage conditions and/or during transportation.

Although several advantages of the disclosed system are set forth in detail herein, the list is by no means limiting. Particularly, one of ordinary skill in the art would recognize that there can be several advantages to the disclosed film and methods that are not included herein.

EXAMPLES

The following Examples provide illustrative embodiments. In light of the present disclosure and the general level of skill, those of ordinary skill in the art will appreciate that the following Examples are intended to be exemplary only and that numerous changes, modifications, and alterations can be employed without departing from the scope of the presently disclosed subject matter.

Several film structures in accordance with the presently disclosed subject matter and comparatives are identified herein below in Tables 1 and 2.

TABLE 1

Resin Identification

| Material Code | Trade Name or Designation | Source |
|---|---|---|
| A | W00038-034 | Westlake Chemical Corporation (Houston, Texas, United States of America) |
| B | Zeonex ® 5000 | Zeon Chemicals, LP (Louisville, Kentucky, United States of America) |
| C | Exact ® 3024 | ExxonMobil Chemical (Spring, Texas, United States of America) |
| D | CV77525 ® | Westlake Chemical Corporation (Houston, Texas, United States of America) |
| E | SP2260 | Westlake Chemical Corporation (Houston, Texas, United States of America) |
| F | GT4402 | Westlake Chemical Corporation (Houston, Texas, United States of America |
| G | Bynel ® 3861 | DuPont Performance Polymers (Wilmington, Delaware, United States of America) |
| H | Soarnol ® ET3803 | Nippon Gohsei (Tokyo, Japan) |
| I | EVAL ® L171B | EVALCA/Kuraray (Osaka, Japan) |
| J | GRILON ® CF6S | EMS-Grivory (Domat, Switzerland) |
| K | Ecdel ® 9965 | Eastman Chemical Company (Kingsport, Tennessee, United States of America) |
| L | SOARNOL ® AT4403 | Nippon Gohsei (Tokyo, Japan) |
| M | Surlyn ® 1705-1 | DuPont Performance Polymers (Wilmington, Delaware, United States of America) |
| N | ELVAX ® 3182-2 | DuPont Performance Polymers (Wilmington, Delaware, United States of America) |
| O | Eval ® XEP-1035 | EVALCA/Kuraray (Osaka, Japan) |
| P | GT7062 | Westlake Chemical Corporation (Houston, Texas, United States of America) |
| Q | Arnitel ® EM630 | DSM Engineering Plastics (Heerlen, Netherlands) |
| R | Topas ® 9903D | Topas Advanced Polymers, Inc. (Florence, Kentucky, United States of America) |
| S | XUS61520.152 | Dow Chemical Company (Midland, Michigan, United States of America) |
| T | Engage ® 8452 | Dow Chemical Company (Midland, Michigan, United States of America) |
| U | Hybrar ® 7311 | EVALCA/Kuraray (Osaka, Japan) |
| V | Septon ® 2004 | EVALCA/Kuraray (Osaka, Japan) |
| W | Kraton ® G1730 | Kraton Polymers (Houston, Texas, United States of America) |
| X | Irganox ® 1010 | BASF Corporation (Florham Park, New Jersey, United States of |

TABLE 1-continued

Resin Identification

| Material Code | Trade Name or Designation | Source |
|---|---|---|
| | | America) |
| Y | Syloid ® 74 × 1000 | Grace Davison (Deerfield, Illinois, United States of America) |
| Z | EVAL ® SP-292B | EVALCA/Kuraray (Osaka, Japan) |

A is very low density polyethylene.
B is cyclic olefin copolymer with density 1.010 g/cc (ASTM D792), melt flow index 9 g/10 min. (ISO 1133), and tensile strength of 45 MPa (ISO 527).
C is ethylene-based metallocene butene plastomer with density 0.905 g/cc (ASTM D882) and Vicat softening point 87.2° C. (ASTM D1525).
D is hexene-based linear low density polyethylene.
E is ethylene methyl acrylate (24% methyl acrylate) with density of 0.944 g/cc and melt index 2.1 g/10 minutes.
F is anhydride modified linear low density polyethylene with melt index of 2.4 g/10 min., density of 0.919 g/cc, and DSC melting point of 122° C.
G is anhydride-modified ethylene vinyl acetate with density of 0.95 g/cc (ASTM D792).
H is hydrolyzed ethylene/vinyl acetate copolymer (36.5-39.5 mole % ethylene) with flow rate of 2.9-3.5 g/10 minutes, density of 1.17 g/cc, melting point (DSC) of 73° C., and glass transition temperature (DSC) of 58° C.
I is ethylene vinyl alcohol copolymer with 27 mol % ethylene, density of 1.2 g/cc (ISO 1183), and Young's modulus of 3000 MPa (ISO 527).
J is nylon 6/12 copolymer with melting point 130° C. (ISO 11357) and density of 1.05 g/cc (ISO 1183).
K is copolyester ether with specific gravity of 1.13 (ASTM D792), flow rate of 20 g/10 min. (ASTM D1238), and glass transition temperature of −3° C.
L is hydrolyzed ethylene/vinyl acetate copolymer (44 mole % ethylene) with flow rate of 3.5 g/10 min., density of 1.14 g/cc, and DSC melting point of 164° C.
M is an ionomer of ethylene acid copolymer with density of 0.95 g/cc (ASTM D792) and melt flow rate of 5.5 g/10 min. (ASTM D1238).
N is ethylene vinyl acetate copolymer (25-29 weight percent vinyl acetate) with density 0.95 g/cc (ASTM D792) and melt flow rate of 3 g/10 minutes (ASTM D1238).
O is ethylene vinyl alcohol copolymer.
P is anhydride grafted EMA.
Q is copolyether-ester elastomer with melting temperature of 212° C. (ISO 11357) and vicat softening temperature of 125° C. (ISO 306).
R is cyclic olefin copolymer with a melt flow index of 0.9 and a glass transition temperature of 33° C.
S is metallocene, with 10 wt % octene, melt index of 0.5, and density of 0.903.
T is polyolefin elastomer with density of 0.875 g/cc (ASTM D792), melt index of 3.0 g/10 min. (ASTM D1238), and elongation at break of 920%.
U is thermoplastic rubber with specific gravity 0.900 g/cc (ASTM D792), 12% styrene, and glass transition temperature of −32° C.
V is hydrogenated styrenic block copolymer (18% styrene) with melt flow of 5.0 g/10 min (ISO 1133) and elongation at break of 690%.
W is styrene ethylene/propylene copolymer (21% polystyrene) with specific gravity of 0.90 g/ccc (ASTM D792) and melt index of 13 g/10 min.
X is phenolic antioxidant with specific gravity of 1.15 g/cc and melting point 110-125° C.
Y is amorphous silica.
Z is ethylene vinyl alcohol copolymer with density of 1.13 g/cc (ISO 1183) and melt index of 190-210° C.

TABLE 2

Film Identification

| Film ID | Layer | Formulation | Volume % | Mils |
|---|---|---|---|---|
| Film 1 | 1 | 45% A | 26.92 | 3.5 |
| | | 40% C | | |
| | | 15% B | | |
| | 2 | 50% D | 23.08 | 3.0 |
| | | 50% E | | |
| | 3 | 50% F | 3.850 | 0.50 |
| | | 50% G | | |
| | 4 | 100% H | 3.850 | 0.50 |
| | 5 | 50% F | 3.850 | 0.50 |
| | | 50% G | | |
| | 6 | 100% I | 3.850 | 0.50 |
| | 7 | 50% F | 3.850 | 0.50 |
| | | 50% G | | |
| | 8 | 50% D | 23.08 | 3.0 |
| | | 50% G | | |
| | 9 | 50% F | 3.850 | 0.50 |
| | | 50% G | | |
| | 10 | 96% J | 3.850 | 0.50 |
| | | 3.24% K | | |
| | | 0.4% X | | |
| | | 0.36% Y | | |
| Film 2 | 1 | 45% A | 19.20 | 2.50 |
| | | 40% C | | |
| | | 15% B | | |
| | 2 | 70% D | 23.1 | 3.00 |
| | | 30% C | | |
| | 3 | 100% F | 5.77 | 0.75 |
| | 4 | 100% L | 3.84 | 0.50 |
| | 5 | 100% F | 5.77 | 0.75 |
| | 6 | 100% H | 3.84 | 0.50 |
| | 7 | 100% F | 5.77 | 0.75 |
| | 8 | 70% D | 23.1 | 3.00 |
| | | 30% C | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 3 | 1 | 45% A | 19.20 | 2.50 |
| | | 40% C | | |
| | | 15% B | | |
| | 2 | 70% D | 23.1 | 3.00 |
| | | 30% M | | |
| | 3 | 100% F | 5.77 | 0.75 |
| | 4 | 100% L | 3.84 | 0.50 |
| | 5 | 100% F | 5.77 | 0.75 |
| | 6 | 100% H | 3.84 | 0.50 |
| | 7 | 100% F | 5.77 | 0.75 |
| | 8 | 70% D | 23.1 | 3.00 |
| | | 30% M | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 4 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% L | 3.84 | 0.50 |
| | 5 | 100% F | 5.77 | 0.75 |
| | 6 | 100% H | 3.84 | 0.50 |
| | 7 | 100% F | 5.77 | 0.75 |
| | 8 | 50% D | 23.1 | 3.00 |
| | | 50% E | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 5 | 1 | 45% A | 19.20 | 2.50 |
| | | 40% C | | |
| | | 15% B | | |
| | 2 | 60% D | 23.1 | 3.00 |
| | | 40% N | | |
| | 3 | 100% F | 5.77 | 0.75 |
| | 4 | 100% L | 3.84 | 0.50 |
| | 5 | 100% F | 5.77 | 0.75 |
| | 6 | 100% H | 3.84 | 0.50 |
| | 7 | 100% F | 5.77 | 0.75 |
| | 8 | 60% D | 23.1 | 3.00 |
| | | 40% N | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 6 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% L | 3.84 | 0.50 |
| | 5 | 100% F | 5.77 | 0.75 |
| | 6 | 100% I | 3.84 | 0.50 |
| | 7 | 100% F | 5.77 | 0.75 |
| | 8 | 50% D | 23.1 | 3.00 |

TABLE 2-continued

Film Identification

| Film ID | Layer | Formulation | Volume % | Mils |
|---|---|---|---|---|
| | | 50% E | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 7 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% H | 3.84 | 0.50 |
| | 5 | 100% F | 5.77 | 0.75 |
| | 6 | 100% I | 3.84 | 0.50 |
| | 7 | 100% F | 5.77 | 0.75 |
| | 8 | 50% D | 23.1 | 3.00 |
| | | 50% E | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 8 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% H | 3.84 | 0.50 |
| | 5 | 100% F | 5.77 | 0.75 |
| | 6 | 100% H | 3.84 | 0.50 |
| | 7 | 100% F | 5.77 | 0.75 |
| | 8 | 50% D | 23.1 | 3.00 |
| | | 50% E | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 9 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% O | 3.84 | 0.50 |
| | 5 | 100% F | 5.77 | 0.75 |
| | 6 | 100% O | 3.84 | 0.50 |
| | 7 | 100% F | 5.77 | 0.75 |
| | 8 | 50% D | 23.1 | 3.00 |
| | | 50% E | | |
| | 9 | 100% F | 5.77 | 0.75 |
| | 10 | 97% J | 3.84 | 0.50 |
| | | 2.43% K | | |
| | | 0.30% X | | |
| | | 0.27% Y | | |
| Film 10 | 1 | 45% A | 19.20 | 2.50 |
| | | 40% C | | |
| | | 15% B | | |
| | 2 | 50% D | 23.1 | 3.00 |
| | | 50% E | | |
| | 3 | 100% F | 5.77 | 0.75 |
| | 4 | 100% O | 3.84 | 0.50 |
| | 5 | 100% F | 5.77 | 0.75 |
| | 6 | 100% O | 3.84 | 0.50 |
| | 7 | 100% F | 5.77 | 0.75 |
| | 8 | 50% D | 23.1 | 3.00 |
| | | 50% E | | |
| | 9 | 100% P | 5.77 | 0.75 |
| | 10 | 100% Q | 3.84 | 0.50 |
| Film 11 | 1 | 45% A | 19.20 | 2.50 |
| | | 40% C | | |
| | | 15% B | | |
| | 2 | 50% D | 23.1 | 3.00 |
| | | 50% E | | |
| | 3 | 50% F | 5.77 | 0.75 |
| | | 50% G | | |
| | 4 | 100% H | 3.84 | 0.50 |
| | 5 | 50% F | 5.77 | 0.75 |
| | | 50% G | | |
| | 6 | 100% I | 3.84 | 0.50 |
| | 7 | 50% F | 5.77 | 0.75 |
| | | 50% G | | |
| | 8 | 50% D | 23.1 | 3.00 |
| | | 50% E | | |
| | 9 | 50% F | 5.77 | 0.75 |
| | | 50% G | | |
| | 10 | 97% J | 3.84 | 0.50 |
| | | 2.43% K | | |
| | | 0.30% X | | |
| | | 0.27% Y | | |

Example 1

Preparation of Films 1-11

Films 1-11 were manufactured by cast coextrusion. This method is well known to those of ordinary skill in the art.

Example 2

Tan Delta Testing

In Example 2, the noise dampening properties of several film layers were explored. The polymers were dry blended and then fed into a twin screw extruder to make a 2.0 mil thick cast monolayer film. A film sample from each blend was then tested per ASTM D45065 over a temperature range of $-100°$ C. to $150°$ C. The results are summarized below in Table 3.

TABLE 3

Tan Delta Data

| Experiment No. | Composition | Peak Tan Delta and Temperature (° C.) | Tan Delta at −50° C. |
|---|---|---|---|
| 1 | 60% S | 0.269, | 0.10 |
| | 20% T | −17.6 | |
| | 20% U | | |
| 2 | 60% S | 0.223, | 0.15 |
| | 20% T | −20.4 | |
| | 20% V | | |
| 3 | 60% S | 0.230, | 0.15 |
| | 20% T | −24.9 | |
| | 20% W | | |
| 4 | 60% S | 0.248, | 0.16 |
| | 20% T | −23.6 | |
| | 10% U | | |
| | 10% V | | |
| 5 | 50% D | 0.220, | 0.06 |
| | 50% E | −25.0 | |
| 6 | 50% D | 0.228, | 0.074 |
| | 50% U | −20.0 | |
| 7 | 50% D | 0.364, | 0.053 |
| | 50% U | −22.0 | |
| 8 | 50% D | 0.220, | 0.217 |
| | 50% W | −46.0 | |

Conclusion from Example 2

The data from Table 3 indicates that the dampening layer has a peak tan delta of at least 0.20 at −45° C. to −15° C. and a tan delta of at least 0.05 at −50° C.

Example 3

Drop Testing of Films 2-11

Ten 22 inch×28 inch bags were constructed for each film tested. The bags were filled with 40 L of water and were dropped from 5 feet, 3 times each. A pass (no seal failures) or fail (seal failure) result was recorded for each bag after each drop. Some films (Films 4, 7) were tested multiple times. The results are given below in Table 4.

Films 6, 7, and 11 were further tested after gamma sterilization (40-50 kGy). In this test, several bags were constructed for each film, as indicated in Table 5. The bags were filled with 50 L of water and were dropped 5 feet, one time both before and after exposure to gamma radiation. The drop testing results for the test are shown in Table 5.

Films 6, 7, and 11 were also subjected to ASTM F392-74-D (Gelbo flex test) that subjects the film through 900 cycles on a Model 100 Flex Tester (manufactured by Rogers International). After the completion of the flex testing, each film was tested for pinholes using a colored turpentine solution, as set forth in ASTM F392-93. To prepare the turpentine solution, 5 grams of anhydrous calcium chloride and 1 g of oil-soluble red dye were added to 100 mL chemically pure grade gum spirits turpentine. The container was sealed, shaken, and was left to stand for at least 10 hours, shaking occasionally. The solution was then filtered using dry filter paper at about 21° C. and stored in an airtight bottle. For the pinhole testing, the film specimen was taped to a sheet of white paper, painted with the colored turpentine solution, and allowed to set for 1 minute. The turpentine solution was then wiped off using absorbent tissue paper. The film specimen was then removed from the white paper and each strike-through was counted as a pinhole. The results of the testing are given in Table 6.

TABLE 4

Drop Testing Results for Films 2-10

| Film Tested | # Pass, 1st Drop | # Pass, 2nd Drop | # Pass, 3rd Drop |
| --- | --- | --- | --- |
| 2 | 10 | 9 | 9 |
| 3 | 10 | 10 | 9 |
| 4 | 10 | 10 | 9 |
| 4 | 10 | 9 | 9 |
| 5 | 10 | 10 | 10 |
| 6 | 8 | 8 | 8 |
| 7 | 10 | 10 | 9 |
| 7 | 9 | 9 | 8 |
| 7 | 9 | 9 | 9 |
| 7 | 9 | 8 | 6 |
| 8 | 9 | 9 | 8 |
| 9 | 10 | 9 | 9 |
| 10 | 10 | 8 | 8 |

TABLE 5

Drop Testing + Gamma Radiation Drop Testing Results

| Film Tested | Before Gamma Radiation, # Pass | After Gamma Radiation, # Pass |
| --- | --- | --- |
| 6 | 9/9 | 9/9 |
| 7 | 5/5 | 3/5* |
| 11 | 5/5 | 4/5* |

*No bag failure. Only seal trim due to high sealing temperature.

TABLE 6

Gelbo Flex and Pinhole Testing Results

| Film Tested | Before Gamma Radiation, # Pass | After Gamma Radiation, # Pass | Pinhole Dye Results |
| --- | --- | --- | --- |
| 6 | 4/4 | 4/4 | No dye penetration (no pinholes) |
| 7 | 4/4 | 4/4 | No dye penetration (no pinholes) |
| 11 | 4/4 | 4/4 | No dye penetration (no pinholes) |

Conclusions from Example 4

The use of at least one vibration dampening layer provides high abuse resistance and allows the film to withstand significant flexing and preserves the barrier properties.

Example 5

Oxygen Transmission Rate Testing of Films 4, 6-10

The oxygen transmission rate of films 4 and 6-10 were conducted, with measurements taken at 73° F. and 0% relative humidity, 100% relative humidity, or 50% relative humidity out/100% relative humidity in. Two measurements were taken for each film in accordance with ASTM D-3985, with the results shown in Table 5.

TABLE 5

OTR Results for Films 4 and 6-10

| Film | OTR 0% RH | OTR 50/100 RH | OTR 100% RH |
| --- | --- | --- | --- |
| 4 Before Gelbo Testing | 1.41 | 1.10 | 68.5 |
| 4 After Gelbo Testing | 1.22 | 1.25 | 63.9 |
| 6 Before Gelbo Testing | 0.20 | 0.20 | 93.0 |
| 6 After Gelbo Testing | 0.20 | 0.20 | 89.3 |
| 7 Before Gelbo Testing | 0.20 | 0.20 | 71.1 |
| 7 After Gelbo Testing | 0.64 | 0.20 | 83.6 |
| 8 Before Gelbo Testing | 0.94 | 0.88 | 69.5 |
| 8 | 0.95 | 1.00 | 67.3 |

TABLE 5-continued

OTR Results for Films 4 and 6-10

| Film | OTR 0% RH | OTR 50/100 RH | OTR 100% RH |
|---|---|---|---|
| After Gelbo Testing 9 | 0.30 | 0.79 | 114.0 |
| Before Gelbo Testing 9 | 0.30 | 0.30 | 93.8 |
| After Gelbo Testing 10 | 0.23 | 0.33 | 141.0 |
| Before Gelbo Testing 10 | 0.97 | 0.64 | 142.0 |
| After Gelbo Testing | | | |

Conclusions from Example 5

The use of at least one vibration dampening layer resulted in a film with superior abuse resistance and high barrier, which have proven difficult to combine in prior art films. Oxygen transmission rate before and after Gelbo testing are essentially unchanged.

What is claimed is:

1. A 2D or 3D pouch comprising front and back sheets oriented in a face-to-face relationship and sealed to each other along adjacent side edges to define an interior compartment therebetween, the pouch being formed from a polymeric film comprising:
    a. a first vibration dampening layer;
    b. a second vibration dampening layer;
    c. first and second barrier layers;
    d. a skin layer; and
    e. a sealant layer comprising:
        ii. about 20-50 weight percent lock down sealant having a seal strength of at least 16 pound force in accordance with ASTM F88;
        ii. about 20-50 weight percent metallocene plastomer with melt index in accordance with ASTM D1238≥1.0 and density of less than 0.92; and
        iii. about 10-30 weight percent cyclic olefin polymer;
    wherein the vibration dampening layers have a peak tan delta of at least 0.20 at −45° C. to −15° C. in accordance with ASTM D4065.

2. The pouch of claim 1, wherein the first barrier layer comprises EVOH with 30-48 mole percent ethylene and the second barrier layer comprises EVOH with less than 39 mole percent ethylene.

3. The pouch of claim 1, wherein the film is a multilayer film and said first and second dampening layers are inner film layers.

4. The pouch of claim 1, wherein the layer is positioned adjacent or directly adjacent to an outer film layer.

5. The pouch of claim 1, wherein the film exhibits Young's modulus of about 10,000 to 60,000 pounds/square inch in accordance with ASTM D882.

6. The pouch of claim 1, wherein the film is substantially free of surface-modifying additives and does not inhibit the growth of cell culture.

7. The pouch of claim 1, wherein the film exhibits an oxygen transmission rate of less than 200 cc at 100% relative humidity and 73° F.

8. The pouch of claim 1, wherein the film exhibits an oxygen transmission rate of less than 10 cc at 50% ouU100% in relative humidity and 73° F.

9. The pouch of claim 1, wherein the film exhibits an oxygen transmission rate of less than 10 cc at 0% relative humidity and 73° F.

10. The pouch of claim 1, wherein at least one vibration dampening layer comprises about 25% of the total film thickness.

11. The pouch of claim 1, wherein the vibration dampening layers comprise alpha olefin polymer blended with an acrylate polymer, a styrenic block copolymer, or a modified or grafted acrylate polymer.

12. The pouch of claim 1, wherein the skin layer comprises PET, polyamide, polyethylene, or combinations thereof.

13. The pouch of claim 1, further comprising a solution contained within the interior pouch compartment.

14. The pouch of claim 13, wherein the solution is selected from the group comprising: water, saline solution, buffer solution, Ringer solution, dextrose solution, Hank solution, glucose solution, and combinations thereof.

* * * * *